J. T. LOHR.
Potato-Diggers.
No. 148,473.     2 Sheets--Sheet 1.     Patented March 10, 1874.
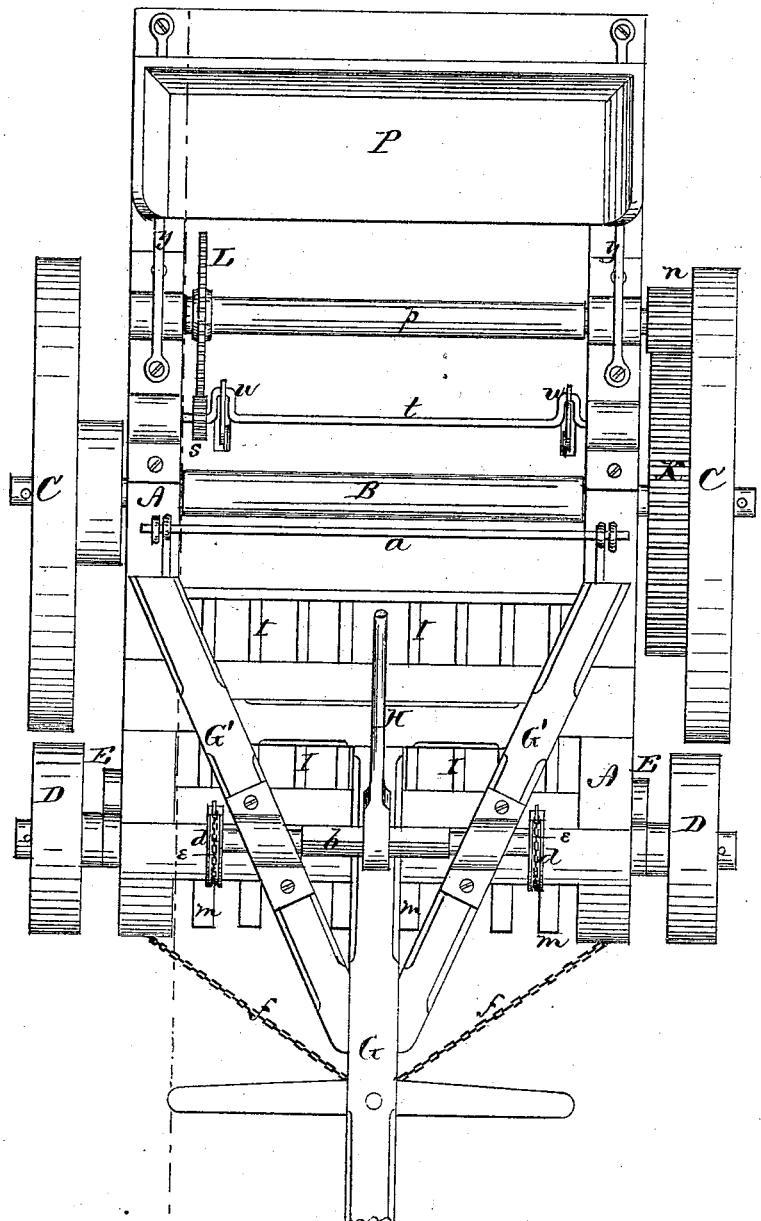

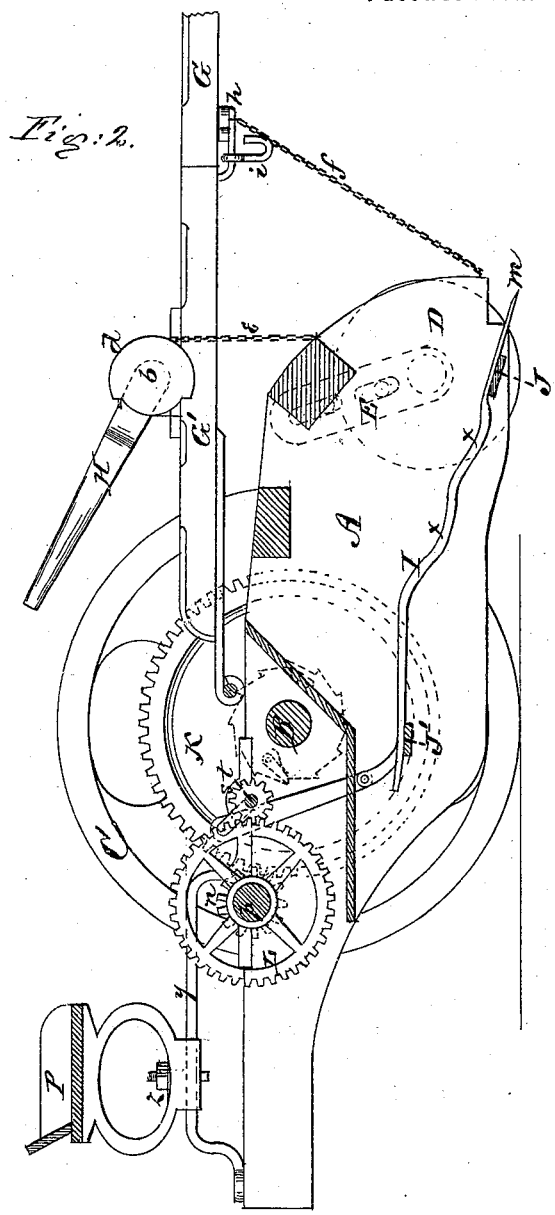

UNITED STATES PATENT OFFICE.

JACOB T. LOHR, OF MANISTEE, MICHIGAN, ASSIGNOR OF ONE-HALF HIS RIGHT TO HENRY SITTERLEY, OF SAME PLACE.

IMPROVEMENT IN POTATO-DIGGERS.

Specification forming part of Letters Patent No. 148,473, dated March 10, 1874; application filed October 8, 1873.

*To all whom it may concern:*

Be it known that I, JACOB T. LOHR, of Manistee, in the county of Manistee and State of Michigan, have invented certain new and useful Improvements in Potato-Diggers; and I do hereby declare the following to be a full, clear, and exact description thereof, reference being had to the accompanying drawings, and to the letters of reference marked thereon, making a part of this specification.

The nature of my invention consists in the construction and arrangement of a machine for digging potatoes, as will be hereinafter more fully set forth.

In order to enable others skilled in the art to which my invention appertains to make and use the same, I will now proceed to describe its construction and operation, referring to the annexed drawings, which form a part of this specification, and in which—

Figure 1 is a plan view, and Fig. 2 a longitudinal vertical section, of my potato-digger.

A represents the frame-work, at or near the center of which are suitable boxes for the axle B to revolve in. This axle passes entirely through the frame, and has upon each end a large driving-wheel, C. The driving-wheels are placed loosely on the axle, and connected to the same by the usual pawl and ratchet, so that in going forward the axle will be revolved by the wheels, while in backing the wheels will turn on the axle. The front end of the frame A is supported upon a wheel, D, on each side, which wheel is placed upon a spindle attached to a bar, E, which is adjustably fastened to the side of the frame, so that the wheel can be raised or lowered at will, thereby regulating the depth at which the digging instruments are to work. G represents the tongue provided with hounds G' G', the rear ends of which are hooked or otherwise attached to a rod, *a*, secured on the frame A above and in front of the axle B. In suitable bearings on the hounds G' is placed a shaft, *b*, which is provided with a lever, H, in the center, and a circumferentially-grooved wheel, *d*, at each end. These wheels are, by chains *e e*, connected with the front end of the machine, so that, by turning the lever H, the whole front end of the machine will be raised up from the ground, and the machine may then be turned on the main wheels C C. The front end of the machine, at the bottom, is, by chains *f f*, connected to the double-tree strap *h* on the tongue, whereby the draft is applied at the bottom, as well as at the top. On the double-tree strap *h* is a hook, *i*, for taking up the chains *f f* to make them of the proper length to pull properly. The digging mechanism consists of a series of spring-steel bars, I I, having at their front ends wrought-iron teeeth *m m*, welded or otherwise permanently attached. The bars I I are riveted or otherwise attached, at or near their front ends at suitable distances apart, to a bar, J, which is hung upon journals or trunnions in the side pieces of the frame A. Their rear ends are also attached to a bar, J', which latter bar, however, is not connected with the frame.

The spring-steel bars I I are, back of the bar J, bent to form two curves, *x x*, which, as the bars work their way through the ground, work the dirt fine and lessens the draft. The bars, being made of spring-steel, prevent any sudden jerk, which is always the cause of bruising the potatoes more or less.

The bars I I, with their teeth, are operated by the following means: On the axle B is a cog-wheel, K, which gears with a pinion, *n*, on a shaft, *p*, and a cog-wheel, L, on this shaft gears with a pinion, *s*, on another shaft, *t*. This latter shaft has two cranks, *w w*, upon which are placed the rear ends of the two bars I I at the sides, which two bars are extended for that purpose. By this means the bars with their teeth obtain a rocking motion, the journals of the bar J forming the fulcrum upon which they turn.

P represents the driver's seat, which is arranged to slide on two rods, *y y*, on the rear part of the frame, and it is fastened at any desired point on said rods by means of set-screws *z z*. By this means the weight of the driver may be made to balance the machine properly.

Having thus fully described my invention, what I claim as new, and desire to secure by Letters Patent, is—

The spring-steel bars I I, having teeth $m$ $m$ and double curves $x$ $x$, and attached to the oscillating bar J, in combination with the bar J' and the crank-shaft $t$ with its gearing, as described, connecting it with the driving-axle, all as set forth.

In testimony that I claim the foregoing I have hereunto set my hand this 13th day of September, 1873.

JACOB T. LOHR.

In presence of—
RICHD. A. SEYMOUR,
F. W. DUNLAP.